United States Patent [19]

Basore et al.

[11] Patent Number: 5,752,232
[45] Date of Patent: May 12, 1998

[54] VOICE ACTIVATED DEVICE AND METHOD FOR PROVIDING ACCESS TO REMOTELY RETRIEVED DATA

[75] Inventors: David Lee Basore, Little Silver, N.J.; William Stuart Meisel, Encino, Calif.

[73] Assignee: Lucent Technologies Inc., Murray Hill, N.J.

[21] Appl. No.: 338,928

[22] Filed: Nov. 14, 1994

[51] Int. Cl.⁶ .................................................. G10L 9/06
[52] U.S. Cl. .................... 704/275; 704/251; 704/253; 704/260
[58] Field of Search ................. 395/2.84, 2.6, 395/2.63, 2.69; 704/251, 253, 260, 275

[56] References Cited

U.S. PATENT DOCUMENTS

| | | | |
|---|---|---|---|
| 4,827,520 | 5/1989 | Zeinstra | 395/2.84 |
| 4,847,885 | 7/1989 | Vittorelli | 379/6 |
| 5,165,095 | 11/1992 | Borcherding | 379/88 |
| 5,199,062 | 3/1993 | Von Meister et al. | 379/67 |
| 5,231,670 | 7/1993 | Goldhor et al. | 395/2.84 |
| 5,444,770 | 8/1995 | Davis et al. | 379/93.09 |
| 5,475,792 | 12/1995 | Stanford et al. | 395/2.42 |
| 5,513,298 | 4/1996 | Stanford et al. | 395/2.52 |

OTHER PUBLICATIONS

Lawrence R. Rabiner and Biing–Hwang Juang, Fundamentals of Speech Recognition, Prentice–Hall, pp. 436–437, 1993.

*Primary Examiner*—Allen R. MacDonald
*Assistant Examiner*—Tālivaldis Ivars Šmits

[57] ABSTRACT

A voice activated device using speaker independent speech recognition is capable of receiving from a remote location the phonetic spellings needed for speech recognition in the device. The phonetic spellings, as well as additional application data, are communicated to the voice activated device from the remote location and stored in the device. A user can then speak voice commands which are intercepted by the device where local processing of the voice commands takes place. The device makes available to the user extensive information pertaining to multiple network services or applications. The information may be communicated to the user by voice or via other communication media.

31 Claims, 3 Drawing Sheets

VOICE ACTIVATED DEVICE AND METHOD FOR PROVIDING ACCESS TO REMOTELY RETRIEVED DATA

FIELD OF THE INVENTION

The present invention relates generally to voice activated devices, and, in particular, to a voice activated device and method for providing access to remotely retrieved data.

BACKGROUND OF THE INVENTION

Current speech recognition technology provides several alternatives for handling variable speech recognition vocabularies. Speaker-dependent methods, such as the method disclosed in U.S. Pat. No. 5,165,095, typically require that each user be prompted and speak each new word at least once to the system prior to using the new word. This approach has some disadvantages. First, the requirement of speaking each new word at least once prior to using it reduces the ease of use of such a method. Second, templates for each word for each user must be stored in some form of memory, thereby resulting in additional costs to devices using such methods. Furthermore, in the event of a malfunction which causes a loss of the stored templates, the user must re-enroll the words. Third, each user must enroll separately and identify himself when using a device incorporating such user-dependent speech recognition methods. Thus, for many applications, speaker independent recognition, requiring no enrollment, is used.

In one known remote speech recognition system, a user calls into a central location and his speech is transmitted over a telephone line to a remote central location where speaker independent speech recognition is performed. In such systems, recognition accuracy typically suffers because of the noise and reduced bandwidth of the telephone line, as well as variations in microphone acoustics in telephone handsets. A number of approaches have been used to solve this problem. For example, U.S. Pat. No. 4,847,885 discloses a system for attempting to improve the remote recognition approach by sending a test signal to compensate for line distortion. Nevertheless, a telephone call to the central location must be made each time the user wishes to use the system. This requirement means that delays may be incurred in making the connection to the central location. Furthermore, the central location must have equipment that can handle the peak volume calls with minimal delay.

SUMMARY OF THE INVENTION

The present invention discloses a voice activated device using speaker independent speech recognition which is capable of being set to establish a connection automatically at a pre-specified time to a remote location. Upon establishing the connection, phonetic spellings needed for speech recognition, as well as additional application data, are communicated in digitized form to the voice activated device from the remote location and stored in the device. Coupled to the device is a microphone which is either built-in to the device or is attached to a separate telephone handset. A user can then speak a voice command into the microphone. A digitized signal corresponding to the voice command is processed locally in a speech recognition unit in the device, which then provides an appropriate response from among the additional application data. The device thus makes available to the user extensive information pertaining to multiple network services or applications. The additional application data may be communicated to the user by voice or via other communication media.

A method of using such a voice activated device is also disclosed. Other features and advantages of the present invention will be readily apparent by reference to the following detailed description and accompanying drawings.

DETAILED DESCRIPTION

Figure 1:
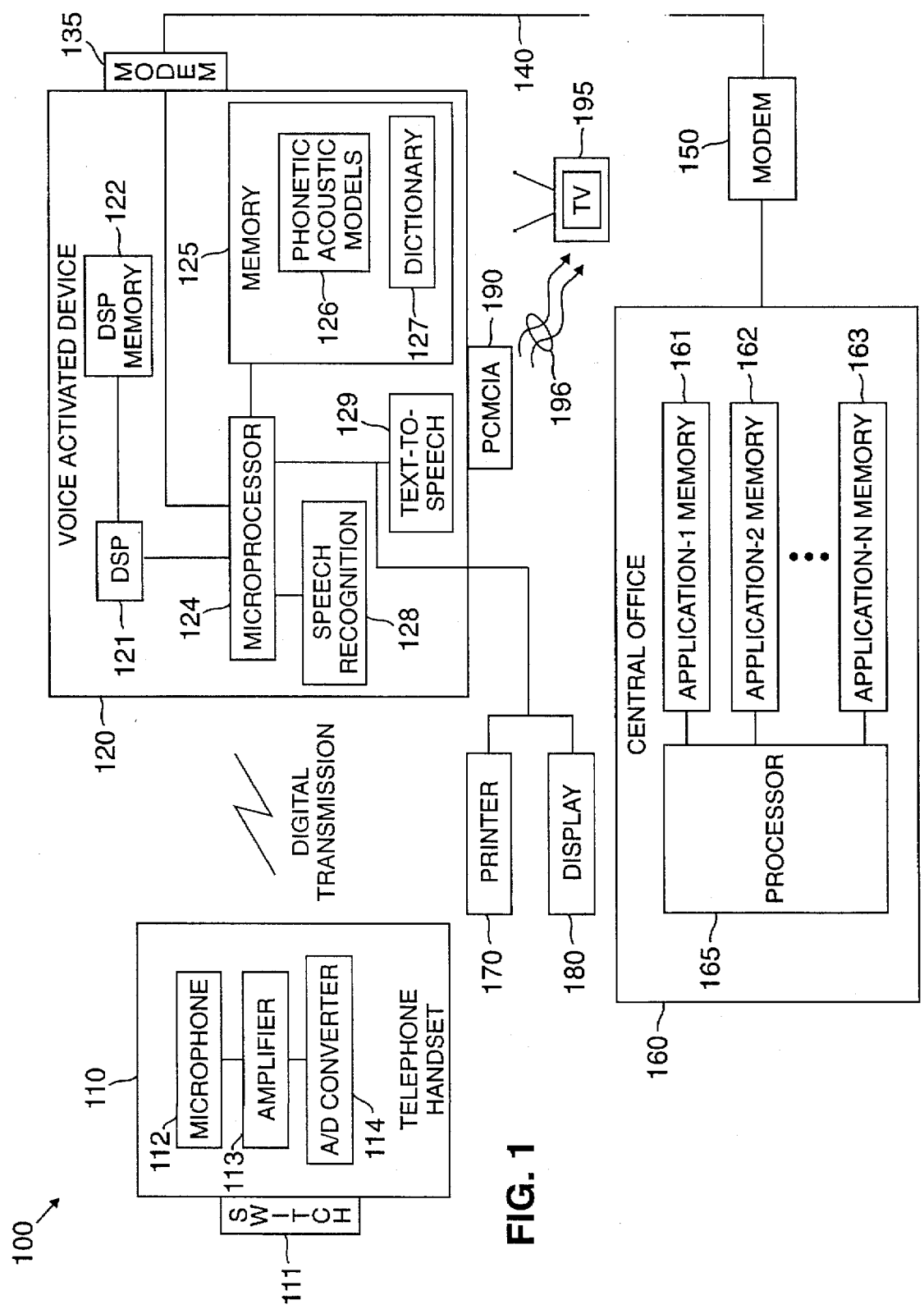
FIG. 1 is a block diagram of a system incorporating a voice activated device according to the principles of the present invention.

FIG. 1 is a block diagram of a system 100 incorporating a voice activated device 120 according to the principles of the present invention. The system 100 includes a telephone handset 110 which preferably is a cordless handset, although other handsets may be used as well. The handset 110 preferably has a switch or button 111 which may be set to one of two positions, each corresponding to one of two operating modes. When the switch 111 is set to a first position, the handset 110 functions like a standard cordless telephone for establishing a voice channel. When, however, the switch 111 is set to a second position, a digital signal is transmitted to the device 120 indicating that voice commands are to be intercepted by the voice activated device 120 as explained further below. In a preferred embodiment, voice commands that are spoken when the switch 111 is in the second position are muted in the voice channel, so that a command may be given during a telephone conversation without the person on the other end of the line hearing it.

The handset 110 preferably includes a directional microphone 112 which receives the user's voice commands and which is designed to minimize background noise. One advantage of the microphone 112 is that phonetic acoustic models can be designed for that specific microphone and, thus, increase speech recognition accuracy in the voice activated device 120. In a preferred embodiment, the handset 110 also comprises an analog-to-digital (A/D) converter 114 which is coupled to the microphone 112 through an amplifier circuit 113. The A/D converter 114 may be, for example, an electronic chip which converts the user's analog voice signal to a corresponding digital signal.

The digital signal is sent in the form of a digital transmission which is received by the voice activated device 120. The handset 110 also sends a digital signal indicating when the position of the switch 111 is changed so that the device 120 knows when to process and respond to voice commands. The voice activated device 120 comprises a digital signal processor (DSP) chip 121 and associated DSP memory 122. The DSP chip 121 is coupled to a microprocessor 124. In certain applications, only the DSP chip 121 or the microprocessor 124 would be required, depending on the capabilities of the particular DSP chip or microprocessor used.

The microprocessor also has an associated memory unit 125. The memory unit 125 comprises a phonetic acoustic models database 126, which is stored in a permanent memory, such as a ROM, and a phonetic spellings dictionary 127. The phonetic acoustic models database 126 stores a plurality of models of how phonemes are spoken. In the present specification and appended claims, the phrase "phonemes" refers to the basic speech sounds, such as those typically found listed in a standard dictionary, which may also include those speech sounds known in the art as allophones, triphones, phonemes in context, and subword units. The dictionary 127 stores the phonetic spellings of words and unique identifiers associated with each such word. According to the principles of the present invention, the particular phonetic spellings that are stored in the dictionary 127 are preferably received from a remote central office 160 or other physically remote location, as explained further below.

The voice activated device 120 also includes a speech recognition unit 128 and a text-to-speech unit 129. The speech recognition unit 128 and the text-to-speech unit 129 may be separate electronic or other hardware units which are connected to the microprocessor 124. Alternatively, they may suitably be software programs running on the microprocessor 124. The voice activated device 120 may also be connected to or have a built-in printer 170 or a display screen 180.

The voice activated device 120 is capable of being coupled to the remote central office 160 such that data can be transmitted between the device 120 and the central office 160. For this purpose, the device 120 has means for establishing a connection to the remote office 160. The means for establishing the connection may suitably include a software modem 135, connected to the microprocessor 124. The modem 135 may also be connected to the remote central office 160 via a telephone line 140 and a modem 150, as shown in FIG. 1. The telephone line 140 may be a line which is suitable for transferring data, or a voiceline which permits the transfer of data and voice on the same telecommunication line. Alternatively, the voice activated device 120 may be coupled to the remote central office 160 using other known techniques such as wireless telecommunication networks.

The remote central office 160 may suitably comprise a computer or general purpose processor 165 connected to at least one application memory unit. FIG. 1 shows a plurality of application memory units labelled with reference numbers 161, 162 and 163. Each application memory unit, such as the memory 161, stores the phonetic spellings of certain words used in a particular application. For some applications, the application memory unit also stores application data that is relevant to the particular application. It should be understood that depending upon the application environment, there may be as few as one as well as more than three application memory units in the central office 160. It should also be understood that the plurality of application memory units 161–163 may be contained within one physical memory unit.

Figure 2:
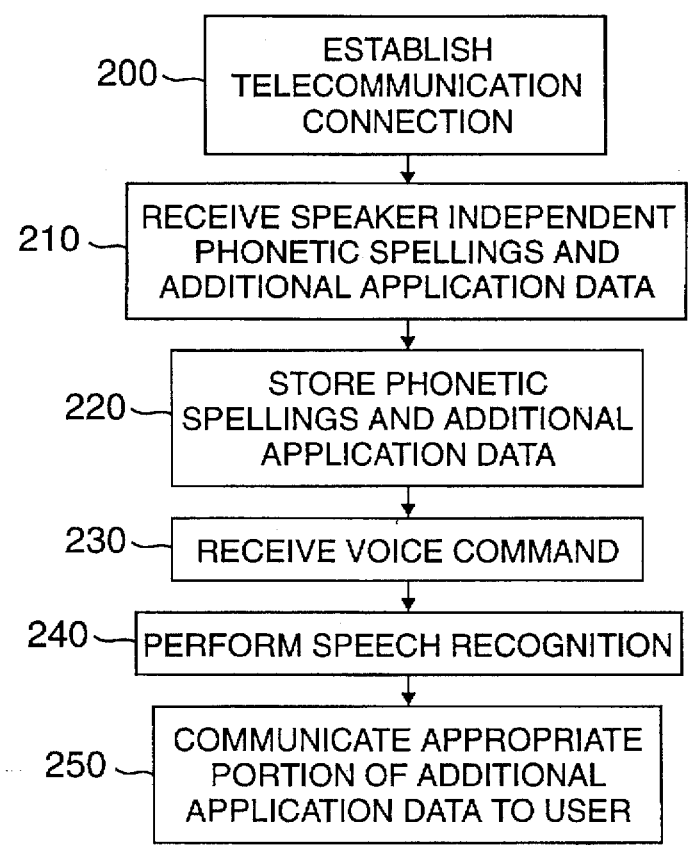
FIG. 2 is a flow chart illustrating a method of using the system of the present invention.

The presently preferred operation of the system 100 is as follows. Reference is made to FIG. 2 which is a flow chart illustrating a method of using the system 100. On a periodic basis, at pre-specified or pre-set times, such as at times entered into the device 120 by the user, the device 120 automatically dials a pre-programmed telephone number to establish a connection with the remote central office 160 as shown in step 200. The microprocessor 124 may be conveniently set, for example, to establish the connection to the remote location each Sunday at one A.M. or each day at five A.M. Alternatively, the connection may be established upon the request or demand of the user. Once a connection is established, the device 120 sends a user identifier and, preferably, the date of the previous update as well, if there was a previous update.

Next, the processor 165 at the central office 160 retrieves the phonetic spellings for the applications for whose services the user is registered. As shown in step 210, this information is then communicated to and received by the device 120 along with a unique identifier for each word. Transmitting the phonetic spellings requires less information to be sent than transmitting acoustic representations of the same words. As a result, the modem 135 can be a low speed and low cost modem. In a preferred embodiment, additional application data that is relevant to the applications for whose services the user is registered is also communicated to the device 120. The additional application data may be suitably communicated in the form of digital data, such as digitized text or digitized compressed speech, for example, depending upon the particular application. Voice prompts can be efficiently sent as text to be converted to speech using the text-to-speech unit 129. If the date of the previous update is received by the central office 160, then only the phonetic spellings and additional application data that have been added, deleted or changed since the previous update are communicated to the device 120. To preserve memory, obsolete phonetic spellings are deleted from the local dictionary 127.

Applications for which phonetic spellings and additional application data may be communicated to the voice activated device 120 include, for example, information related to weekly television schedules, daily weather reports, selected stock prices, selected news highlights, and shopping specials, among others. These applications are intended to be exemplary only and are not intended to limit the scope of the invention.

When the device 120 receives the updated phonetic spellings and additional application data, it stores the phonetic spellings, as well as the unique identifiers associated with each word, in the dictionary 127 as shown in step 220. The additional application data may be stored elsewhere in the memory unit 125 of the device 120.

Figure 3:
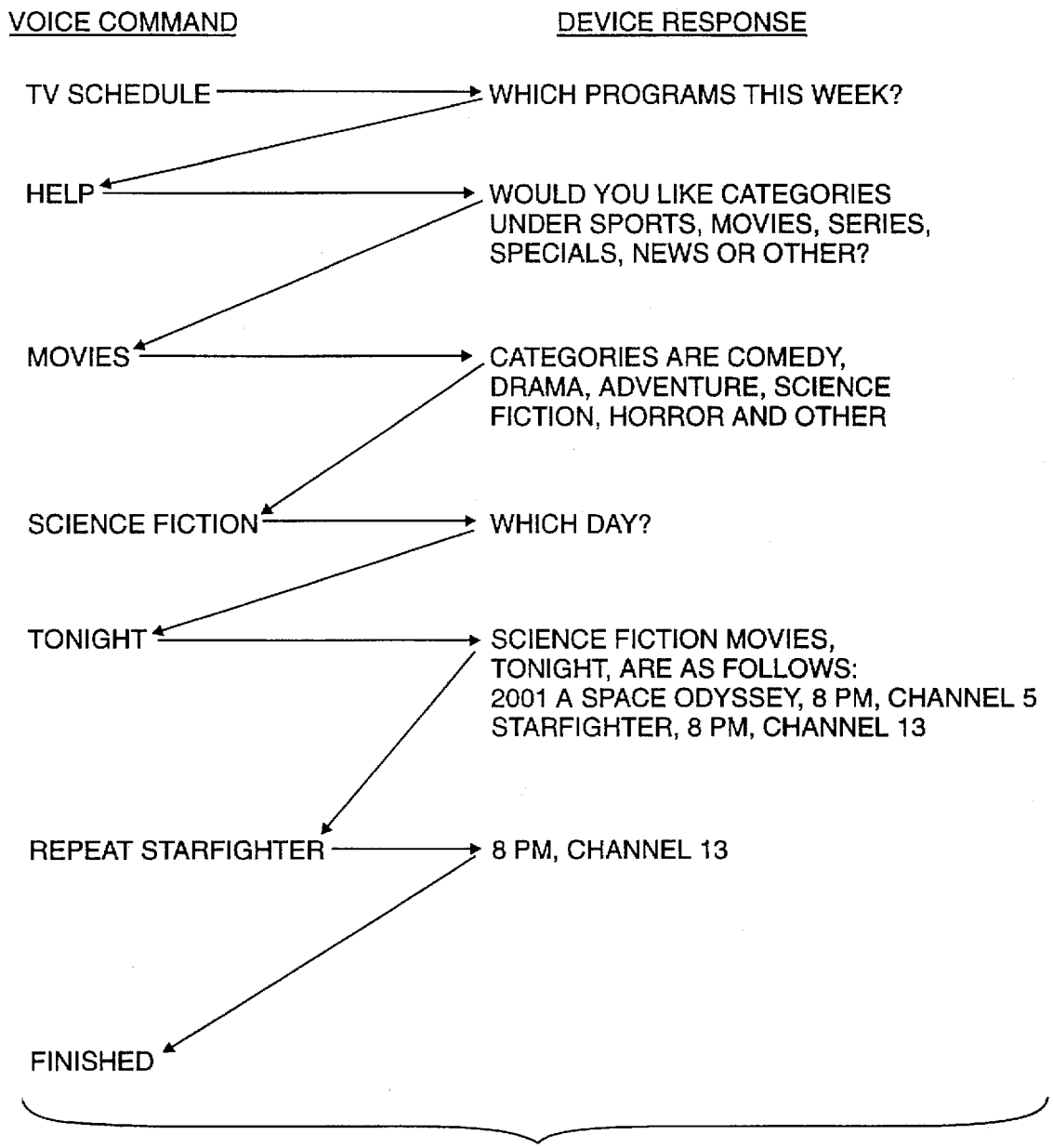
FIG. 3 illustrates an exemplary exchange of voice commands and corresponding responses according to the principles of the present invention.

The voice activated device 120 can then make extensive information quickly available to the user without requiring a high bandwidth network. FIG. 3 illustrates an exemplary interchange of voice commands and responses using a weekly television schedule as the exemplary application. In particular, the left-hand column of FIG. 3 lists the exemplary voice commands issued by the user. The right-hand column lists the corresponding responses by the device 120. It is assumed that phonetic spellings corresponding to each command are currently stored in the dictionary 127. Similarly, it is assumed that the additional application data comprises the responses which are also stored in the memory unit 125.

To issue the first exemplary voice command as shown in FIG. 3, the user would push the switch 111 on the handset 110 to the second position and speak the command "TV schedule." This command would be transmitted by the handset 110 in the form of a digital transmission, and received by the speech recognition unit 128 in the voice activated device 120 as shown in step 230. Next, as indicated by step 240, speech recognition processes are performed. Application software, which resides in the microprocessor 124, interacts with the speech recognition unit 128 to pre-process the digitized speech. During front-end spectral processing, the digitized speech is converted, for example, to a representation of cepstral coefficients using fast Fourier transform analysis.

Next, further processing is performed to recognize the word or words in the user's voice command by forming word models. The word models are constructed, in a manner known in the art, from the phonetic acoustic models database 126 and the phonetic spellings stored in the dictionary 127. The speech recognition unit 128 is, therefore, effectively coupled to the phonetic acoustic models database 126 and the dictionary 127 via the microprocessor 124. The reader is referred, for example, to the text *Automatic Speech Recognition: The Development of the SPHINX System* (Kluwer Academic Publishers 1989) by K. F. Lee for a more detailed discussion pertaining to this and other aspects of the speech recognition processes.

Once the command spoken or issued by the user is recognized, the application software residing in the microprocessor 124 uses the unique word identifiers associated with the word or words that comprise the command to retrieve the appropriate response from among the additional application data stored in the memory unit 125. The appropriate or corresponding response to the command "TV schedule" in the example of FIG. 3 is "Which programs this week?" This response is communicated to the user as indicated by step 250. In a preferred embodiment of the present invention, the response text is sent to the text-to-speech unit 129 and transformed into an acoustic response. The device 120 would thus issue the acoustic response "Which programs this week?"

Upon receiving the response "Which programs this week?" the user might, for example, issue the command "Help." The application software residing in the microprocessor 124 selects the active vocabulary in the dictionary 127 according to the application and according to the previous command or commands. The response to the command "Help," for example, will preferably depend upon the previous commands and may differ depending upon what those previous commands were. Again, the device 120 performs the pre-processing and back-end processing so as to recognize the spoken command. Then, following the example of FIG. 3, the device 120 would respond "Would you like categories under sports, movies, series, specials, news, or other?" The remainder of FIG. 3 illustrates further exchanges of spoken commands and corresponding responses using the TV schedule application. The last command shown in FIG. 3, "Finished," would indicate to the device 120 that the user has terminated the current session.

The response text corresponding to a particular voice command alternatively may be sent to the printer 170 or the display screen 180 for printing or viewing, respectively, by appropriately programming or instructing the device 120. The display screen 180 may be, for example, a television screen or computer monitor. These alternative means for communicating the response to the user may be preferable in some applications, particularly where the response of the device 120 comprises a substantial amount of information. In yet another application of the device 120, additional hardware may be attached to the device 120 via a PCMCIA card slot, serial port, or other means 190 so as to permit the device 120 to respond in other ways, such as transmitting an infrared signal 196 at a predetermined frequency to control a television set 195, for example.

In an alternative mode of using the device of the present invention, only the phonetic spellings to be stored in the dictionary 127 would be communicated to the device 120 when it automatically establishes a connection to the remote location 160 at the pre-specified time. Voice recognition processing still would be done locally in the device 120. The device 120, however, would then establish a connection to the central office 160 and transmit a sequence of identifiers associated with the recognized word or words. The determination and retrieval of the appropriate response to the voice command would then take place at the central office 160 before being sent to the device 120 to be communicated to the user. Although this embodiment of the device 120 requires an on-line connection to be established each time the user uses the device 120, this embodiment may be more economical for applications having a large amount of additional application data that would otherwise need to be stored in the memory unit 125 of the device 120.

The present invention includes several advantageous features. One advantage of the present invention is achieved by performing voice recognition locally in the device 120 rather than at the remote central office 160. This feature alleviates the problems of distortion of the user's voice commands that may occur when using remote recognition. Also, performing the voice recognition locally in the voice activated device 120 using speaker independent speech recognition means that a user need not speak each word at least once prior to using that word as a command in conjunction with the device. In addition, should a malfunction occur resulting in a loss of the information stored in the dictionary 127, for example, the information easily can be stored again in the device 120 by transmitting the phonetic spellings to the device 120 when it communicates with the central office 160 as explained above. Furthermore, the voice activated device 120 can make extensive information from multiple network services quickly available to the user.

Although the present invention has been described with reference to specific embodiments, it will be appreciated that other arrangements within the spirit and scope of present invention will be readily apparent to persons of ordinary skill in the art. The present invention is, therefore, limited only by the appended claims.

We claim:

1. A voice activated device comprising:

a microprocessor programmed to control establishment of a phone connection to a remote central office by dialing a telephone number assigned to the remote central office, so as to receive, from said remote central office, speaker independent phonetic spellings of words associated with specified applications, and additional application data associated with said specified applications;

means for establishing said phone connection to the remote central office;

memory for storing said phonetic spellings and said additional application data;

a speech recognition unit which employs the speaker independent phonetic spelling in recognizing voice commands;

a phonetic acoustic models database; and means for communicating, in response to a voice command of a user of said device, an appropriate portion of said additional application data to the user of said device.

2. The device of claim 1 wherein said means for communicating comprises a text-to-speech unit.

3. The device of claim 1 wherein said means for communicating comprises a display screen coupled to said microprocessor.

4. The device of claim 1 wherein said means for communicating comprises a printer coupled to said microprocessor.

5. The device of claim 1 wherein said microprocessor is programmed to establish said connection automatically at a pre-specified time.

6. The device of claim 5 wherein said microprocessor is further programmed to establish automatically a connection to said remote location on a periodic basis so as to update the phonetic spellings and additional application data stored in said memory.

7. The device of claim 1 wherein said speech recognition unit is coupled to a telephone handset.

8. The device of claim 7 wherein said telephone handset comprises a directional microphone, and said recognition unit employs a phonetic acoustic model designed to match the directional microphone thereby increasing recognition accuracy.

9. The device of claim 7 wherein said telephone handset comprises a switch having two positions, wherein when said switch is set to a first position, said telephone handset functions as a standard telephone handset for establishing a voice channel, and when said switch is set to a second position, said telephone handset allows voice commands to be intercepted by said speech recognition unit.

10. The device of claim 1 further comprising a switch having two positions, wherein when said switch is set to a first position, said speech recognition unit does not intercept and process voice commands, and when said switch is set to a second position, said speech recognition unit intercepts and processes voice commands.

11. A voice activated device comprising:

a microprocessor programmed to control establishment of a phone connection to a remote central office by dialing a telephone number assigned to the remote central office, so as to receive, from said remote central office, speaker independent phonetic spellings of words associated with specified applications, and additional application data associated with said specified applications;

a modem for establishing said phone connection to the remote central office;

memory for storing said phonetic spellings and said additional application data;

a speech recognition unit;

a phonetic acoustic models database; and a text-to-speech unit which communicates an appropriate portion of said application data to a user of said device in response to a voice command by the user.

12. The device of claim 11 further comprising a telephone line connecting said modem and said remote central office.

13. The device of claim 11 wherein said speech recognition unit is coupled to a telephone handset.

14. The device of claim 13 wherein said telephone handset comprises a directional microphone.

15. The device of claim 14 wherein said telephone handset comprises a switch having two positions, wherein when said switch is set to a first position, said telephone handset functions as a standard telephone handset for establishing a voice channel, and when said switch is set to a second position, said telephone handset allows voice commands to be intercepted by said speech recognition unit.

16. The device of claim 11 further comprising a switch having two positions, wherein, when said switch is set to a first position, said speech recognition unit does not intercept and process voice commands, and when said switch is set to a second position, said speech recognition unit intercepts and processes voice commands.

17. A voice activated device comprising:

a microprocessor set to establish a connection automatically to a predetermined remote location at a pre-specified time so as to receive, from said remote location, speaker independent phonetic spellings of words associated with specified applications;

means for establishing said connection;

memory for storing said phonetic spellings;

a speech recognition unit;

a phonetic acoustic models database;

means for receiving, in response to a voice command, additional application data associated with said specified applications from said remote location; and means for communicating, in response to said voice command, an appropriate portion of said additional application data to a user of said device.

18. The device of claim 17 wherein said means for communicating comprises a text-to-speech unit.

19. The device of claim 17 wherein said means for communicating comprises a display screen coupled to said microprocessor.

20. The device of claim 17 wherein said means for communicating comprises a printer coupled to said microprocessor.

21. The device of claim 17 wherein said microprocessor is further set to establish automatically a connection to said remote location on a periodic basis so as to update the phonetic spellings stored in said memory.

22. The device of claim 17 wherein said speech recognition unit is coupled to a telephone handset.

23. The device of claim 22 wherein said telephone handset comprises a directional microphone.

24. The device of claim 22 wherein said telephone handset comprises a switch having two positions, wherein when said switch is set to a first position, said telephone handset functions as a standard telephone handset for establishing a voice channel, and when said switch is set to a second position, said telephone handset allows voice commands to be intercepted by said speech recognition unit.

25. The device of claim 17 further comprising a switch having two positions, wherein when said switch is set to a first position, said speech recognition unit does not intercept and process voice commands, and when said switch is set to a second position, said speech recognition unit intercepts and processes voice commands.

26. A method of communicating information comprising the steps of:

(a) establishing a telecommunication connection to a remote location;

(b) receiving from said remote location a plurality of speaker independent phonetic spellings of words and additional application data;

(c) storing said phonetic spellings and said additional application data;

(d) receiving a voice command;

(e) performing speech recognition processes using said phonetic spellings; and (f) communicating, in response to said voice command, an appropriate portion of said additional application data.

27. The method of claim 26 wherein the steps (a), (b) and (c) are performed prior to the steps (d), (e) and (f).

28. The method of claim 27 wherein the step of communicating comprises the step of transforming said appropriate portion of said additional application data into audible speech using text-to-speech algorithms.

29. The method of claim 27 wherein the step of communicating comprises the step of displaying said appropriate portion of said additional data on a display screen.

30. The method of claim 27 wherein the step of communicating comprises the step of printing said appropriate portion of said additional data.

31. The method of claim 26 wherein the step of establishing comprises the step of establishing said telecommunication connection automatically at a pre-specified time.

* * * * *